Figure 1:
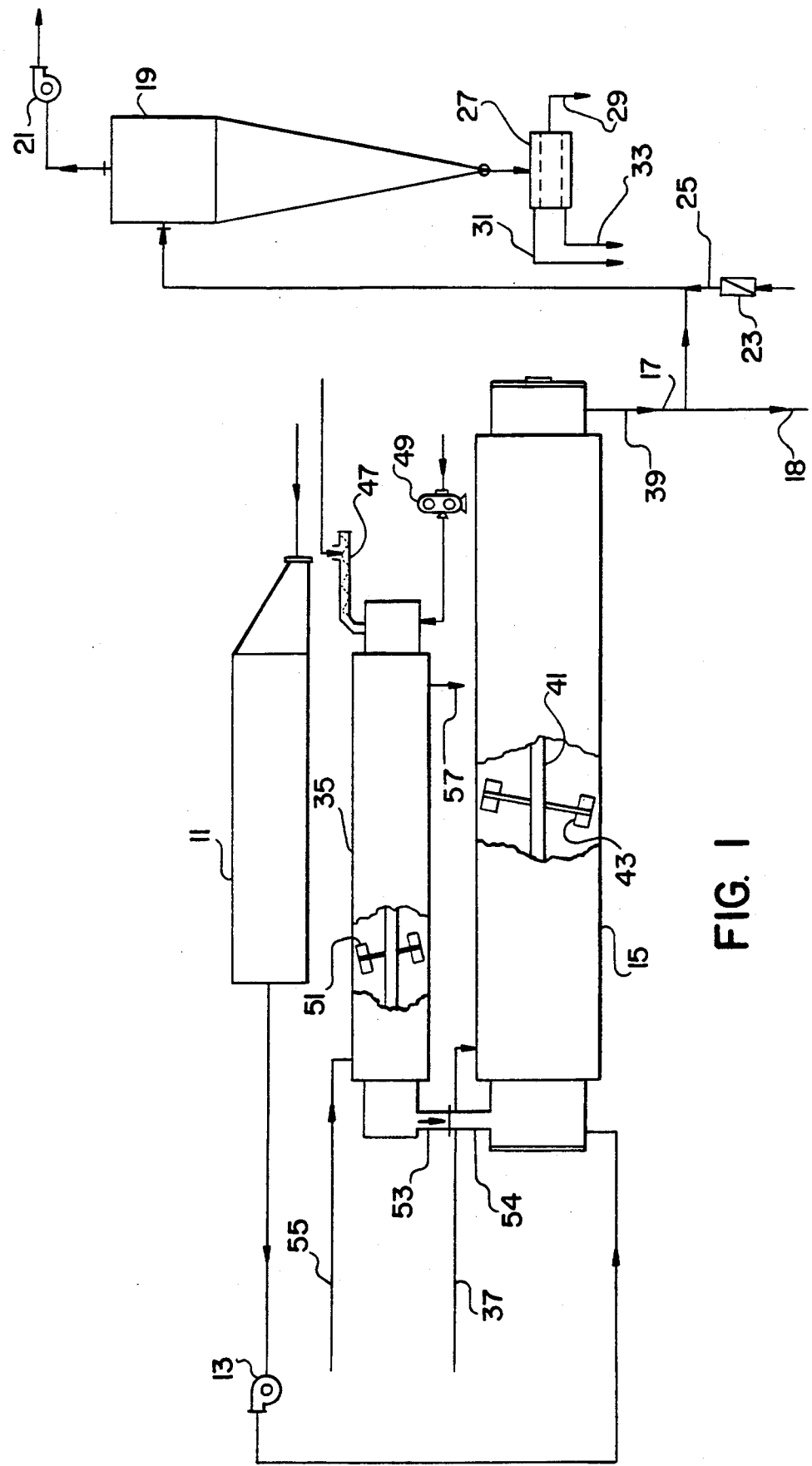

United States Patent [19]

Bianchi et al.

[11] Patent Number: 5,100,510
[45] Date of Patent: Mar. 31, 1992

[54] APPARATUS FOR MANUFACTURING HIGH BULK DENSITY PARTICULATE FABRIC SOFTENING SYNTHETIC ANIONIC ORGANIC DETERGENT COMPOSITIONS

[75] Inventors: Antonio Bianchi; Gualtiero Barletta, both of Rome, Italy

[73] Assignee: Colgate-Palmolive Company, Piscataway, N.J.

[21] Appl. No.: 439,899

[22] Filed: Nov. 20, 1989

Related U.S. Application Data

[62] Division of Ser. No. 187,103, Apr. 28, 1988, Pat. No. 4,894,117.

[51] Int. Cl.⁵ .............................................. B01D 1/14
[52] U.S. Cl. .................................... 159/6.3; 159/9.2; 159/11.2; 159/13.4; 159/16.1; 34/60; 34/136; 209/3; 209/11; 366/24; 366/144
[58] Field of Search ............... 159/6.3, 6.1, 6.2, 9.2, 159/11.2, 13.4, 16.1, 29, 45, 49; 34/60, 136, 137; 366/144, 23, 24; 209/3, 11; 252/8.6

[56] References Cited

U.S. PATENT DOCUMENTS

| | | | |
|---|---|---|---|
| 1,531,438 | 3/1925 | Harty et al. | 209/3 |
| 2,148,998 | 2/1939 | Sackett | 366/144 |
| 3,073,449 | 1/1963 | Johanningmeier | 209/11 |
| 3,889,391 | 6/1975 | Malcolm | 34/136 |
| 4,039,171 | 8/1977 | Shearer | 366/144 |
| 4,070,765 | 1/1978 | Hovmand et al. | 34/60 |
| 4,338,732 | 7/1982 | Coxhill | 34/136 |
| 4,497,757 | 2/1985 | Beimesch et al. | 264/13 |
| 4,582,615 | 4/1986 | Ramachandran et al. | 252/89.1 |
| 4,754,437 | 6/1988 | Doom et al. | 366/144 |

Primary Examiner—Wilbur Bascomb, Jr.
Attorney, Agent, or Firm—Benard Lieberman; Murray M. Grill; Robert C. Sullivan

[57] ABSTRACT

A process for manufacturing a high bulk density particulate detergent composition, of a bulk density greater than 0.7 g./cc. and preferably in the range of 0.8 to 1.0 g./cc., includes turbodrying a mixture of synthetic anionic organic detergent, preferably of sodium $C_{12-13}$ linear alkylbenzene sulfonate, water, and fabric softening bentonite, in which turbodrying process the mixture is repeatedly subjected to centrifugal and axial forces which create thin films of the mixture, which are pulled apart, due to such forces, to form particles, which are further turbodried and thereby converted to high bulk density particles of substantially globular shape and desired particle sizes. In a preferred embodiment of the invention the mixture charged to the turbodryer is made by turbomixing and aqueous solution, dispersion or paste of anionic detergent with bentonite, and the mixture made thereby is directly turbodried.

Also described are combined turbomixng and turbodrying apparatuses, and products of the invented processes.

2 Claims, 1 Drawing Sheet

APPARATUS FOR MANUFACTURING HIGH BULK DENSITY PARTICULATE FABRIC SOFTENING SYNTHETIC ANIONIC ORGANIC DETERGENT COMPOSITIONS

This is a division of application Ser. No. 07/187,103, filed Apr. 28, 1988, now U.S. Pat. No. 4,894,117.

This invention is of a process for manufacturing high bulk density particulate fabric softening synthetic anionic organic detergent compositions which are useful additives to convert spray dried or other suitable particulate base builder beads or compositions to particulate built fabric softening laundry detergent compositions. More particularly, the invention relates to processes which utilize turbodrying of aqueous synthetic anionic organic detergent and powdered inorganic carrier (preferably fabric softening bentonite) for such detergent, to produce substantially globular dried particles of high bulk density and of sizes in desired ranges for employment as particulate detergents or as components of particulate detergent compositions.

Particulate heavy duty laundry detergent compositions that include synthetic anionic organic detergents, builders, adjuvants and a relatively small proportion of water are commercially marketed in the United States and throughout the rest of the world under various brand names. Although some such products are made by merely mixing various granular components thereof, most of them, at least in the United States, are manufactured by spray drying processes wherein aqueous crutcher mixes of the components are spray dried in drying towers to globular beads, which are preferably of sizes in the No.'s. 8 to 140 sieves range, more preferably the No.'s. 8 to 120 sieves range (U.S. Sieve Series). Such spray dried beads may be perfumed or may have various adjuvants post-added to them in powdered, spray dried, agglomerated or liquid forms, providing that such adjuvants do not cause the products to stick together, cake on storage, or flow poorly.

When bentonite, clays or other powdered insoluble fillers or adjuvants are to be incorporated in the detergent composition they may be included in the crutcher mix and may be spray dried with the synthetic detergent and builder salts, but in such processes bentonite has sometimes interfered with the miscibility of the crutcher mix, apparently due to its gelling tendencies. Also, bentonite and anionic detergents tend to make spray dried products of lower bulk density than is often desired, as when such products are intended to be sold as "concentrated" detergents or are intended to be employed in automatic dispensing devices that have been incorporated in some automatic washing machines, which devices have often been designed to dispense high bulk density particulate materials. Furthermore the inclusion of bentonite in the crutcher mix may limit the throughput of active detersive component through the spray tower.

It has been known to convert bentonite from finely divided powders, such as those which pass a No. 325 sieve, into larger particles, of sizes like those of the compositions of the present invention, by agglomerating such bentonite powder in a mixer, such as a revolving horizontal drum, while spraying onto moving surfaces of the bentonite an aqueous solution of binder, such as a suitable inorganic salt, e.g., sodium silicate, or a water soluble organic polymer, such as maleic-acrylic copolymer, e.g., that sold under the trademark Sokolan ® CP-5. It has also been known to agglomerate bentonite onto spray dried detergent composition particles by tumbling the bentonite powder and such particles in a mixer and spraying water or an aqueous solution of binding agent onto moving surfaces of the mixing particles.

Nonionic detergent, in liquid state, has been sprayed onto and absorbed by spray dried base builder beads to convert such beads to particulate built nonionic detergent compositions and some such compositions have been made of comparatively high bulk densities and were still sufficiently flowable and resistant to caking on storage so that they could be marketed.

Although the various products described above have been made prior to the present invention it has not heretofore been considered to be commercially practicable to manufacture particulate built synthetic anionic organic fabric softening detergent compositions containing bentonite as a fabric softener, which would be of high bulk density and would be of desirable particle sizes, aesthetic characteristics and utilitarian properties, with the exceptions of a few processes which will now be discussed. In U.S. Pat. No. 4,828,721, agglomerations of synthetic anionic organic detergent, in aqueous medium (after neutralization), with bentonite are described, and such processes can yield particulate product of high bulk density, e.g., 0.7 g./cc. However, the present processes are superior to and more reproducible than those of the mentioned paten application (which is hereby incorporated by reference), apparently due to manufacturing differences. In the processes of the present invention a uniform paste or slurry is drawn into a film or thin layer of such composition, which is then subdivided due to the forces exerted on it in a turbodryer. Subsequently, the small pieces are shaped to globular particles or beads as they are being dried. Such beads, being of more uniform composition than particles which are essentially cemented together only at some portions of their surfaces, are stronger, and the manufacturing process is more controllable, because the forming of the particles depends primarily on the conditions in the turbodryer (temperature, turbine speed and feed rate), rather than on variations in particle sizes of the bentonite or adhesive properties of the aqueous detergent medium.

A search of selected patents and patent applications in applicants' assignee's files has disclosed brief mentions in U.S. Pat. Nos. 4,488,972 and 4,582,615 of agglomerating sprays that may sometimes include nonionic detergents and other materials, which sprays can be employed to agglomerate bentonite powders. Also at page 17 of patent application Ser. No. 368,736, of Ramachandran and Parr, filed Apr. 15, 1982 (which has been abandoned, but for which corresponding foreign specifications have been published, including those of British Application No. 83.10065 and French Application No. 8306043), it is mentioned that bentonite powder may be agglomerated onto spray dried detergent beads and that the agglomerating spray utilized may be water or aqueous solutions of various other materials, including surface active agents. At page 18 of such specification it is mentioned that an aqueous solution of anionic detergent or a liquid state nonionic detergent may be sprayed onto detergent composition base particles before mixing thereof with bentonite. However, such disclosures are not considered especially relevant to the present invention because aqueous solutions of anionic detergents are not described or suggested therein for mixing with bentonite or other suitable clay component of detergent compositions, and for conversion to particulate forms. The reference at page 18 of Ser. No. 368,736 is to a post-spraying of detergent onto detergent composition particles, which absorb the detergent. Thus, this reference does not suggest mixing bentonite powder with an aqueous solution of anionic detergent, and converting the mix to bead form.

The advantages of the present processes (and products and apparatuses) are significant. By means of the processes one is able to manufacture fabric softening anionic detergent compositions (or insoluble carrier - anionic detergent compositions) of desired high bulk density, and such can be done by an energy conserving process. The products obtained are of attractive globular shape, of desired particle sizes and ready flowability, and are non-caking. By such processes anionic detergent is readily converted to particulate and non-dusting form, in which form it can conveniently be blended with builder beads and other constituents of built laundry detergent compositions, in desired proportions, to "tailor-make" such products. The apparatus employed is essentially trouble-free and can be automated or can require only a single operator to control it. When fuel is scarce or expensive the present processes and apparatuses are especially advantageous and that is also the situation when spray tower capacity at particular locations is a limiting factor in the manufacturing of detergent products. Another advantage of the present processes is in the availability of equipment suitable for use therein. Such equipment is marketed by Vomm, S.p.A. and is reportedly the subject of an Italian patent application. A similar apparatus is sold in the United States by Bepex Corp. under their trademark SOLIDAIRE®. Such apparatuses have been employed before for mixing and drying a variety of other products but prior to the present invention, so far as is known, they were never utilized to make high bulk density particulate anionic detergents from detergent solution or paste and bentonite, or from other anionic detergents and clays or other insoluble carrier powders. Also, although the individual apparatuses employed in the present invention the turbomixer and the turbodryer) are not novel, it is considered that combinations thereof, as employed in applicants' processes and in conjunction with other equipment, are novel and are unobvious from art known to applicants.

The invention will be more readily understood, it is believed, by reference to the drawing,which is a part of this application, in which:

FIG. 1 is a schematic representation of the apparatus of the present invention, showing a turbomixer employed in conjunction with a turbodryer and auxiliary equipment, in preparing a bentonite/LAS (linear alkylbenzene sulfonate) solution mixture, drying it, screening the product and returning off-specification materials to the mixer to be reworked.

In FIG. 1 drying air enters dryer 11 and after being heated therein, it passes through blower 13 into turbodryer 15. After completing its drying function it exits the turbodryer through line 17 to cyclone separator 19, and out through blower 21. Additional air may be controllably admitted to the cyclone separator to cool any product contained in the exit air and such controlled admission is represented by control 23 in line 25. Any entrained product dropped out in the cyclone separator passes to screen 27, wherein acceptable on-specification product is separated and removed, as represented by line 29. Oversized particles are withdrawn through line 31 and undersized particles are taken off through line 33,and both are returned to turbomixer 35 via line 46 and feeder 47. Turbodryer 15 includes a jacket (not illustrated) for heating the internal walls thereof, through which jacket there may be passed hot water, steam, or other heated heat transfer fluid, such as ethylene glycol or stable oils,to raise the wall temperature and to facilitate drying of the LAS-bentonite paste or slurry, to be charged to the dryer. Arrows 37 and 39 represent the heating fluid entering and leaving the heating jacket, respectively. Turbodryer 15 contains drive shaft 41 and a plurality of turbine blades, such as are schematically represented by blade 43. As illustrated the product being dried is being moved from left to right by such turbine blades at the same time that it is being subjected to centrifugal and axial forces by such blades, which actions result in forming the particles. Such contemporaneous forming, shaping and drying in the dryer are facilitated by the relatively high volume ratio of air to product therein, which is usually in the 5–100:1 range, preferably 10–40:1, e.g., about 25:1. Dried product is continuously removed from the apparatus, as represented by arrow 17. Sometimes the product may be taken off directly, as represented by arrow 18 but when it contains fines it will be passed to the cyclone 19. In some instances the directly removed product may be useful without screening to specification sizes but preferably it will be screened, in exactly the same manner as previously illustrated for entrained product removed by the cyclone separator 19, and off-specification material will also be returned to the turbomixer. Optionally, such off-specification material can be returned to the upstream side of the turbodryer but it will be more assuredly homogeneously dispersed in the product if it is subjected to turbomixing first. Feeder 47 controllably feeds powdered bentonite and any off-specification product to turbomixer 35 and metering pump 49 feeds the detergent solution or paste to the turbomixer. In the turbomixer turbine blades 51 subject the mix to centrifugal and axial forces, repeatedly shearing, separating and reconstituting it, and promoting excellent blending of the powder and liquid components. Additionally, any reworked particles of product are broken down and uniformly dispersed throughout the mix. The mix exits through line 53 which is directly connected to an inlet 54 to turbodryer 15. In some cases the mix may be pumped from the turbomixer to the turbodryer by means of a suitable pumping apparatus, such as a gear pump or Moyno pump, but such is not normally necessary. Arrows 55 and 57, respectively, represent the passage of temperature controlling fluid into and out of a suitable jacket (not illustrated) for the turbomixer. Such fluid may be any of those previously mentioned for the turbodryer, and may be employed either to heat or to cool the turbomixer walls, and through them it heats or cools the mix being processed, to obtain better mixing.

The manufacturing process illustrated in the drawing may be further modified or supplemented in various ways to produce different products or to comply with environmental regulations. Thus, dust hoods may be employed and exit air from blower 21 may be filtered before discharge to the atmosphere, in which case any dust removed therefrom may be recycled to the turbomixer with recycles from the turbodryer and from the cyclone separator. In addition to the bentonite or powdered carrier and the LAS or anionic detergent solution or paste, other desired components of the particulate product, usually in minor proportions, may be fed to the turbomixer with such main components, or may be post-applied. As illustrated, the processing is continuous, so continuous metering feeders for various components of the final product will be employed. However, it is within the invention to operate batchwise too, in which case such metering apparatuses are not needed. It is also within the invention to employ the turbodryer in conjunction with other mixing devices than the turbomixer, such as conventional dough mixers, sigma blade mixers, in-line mixers and colloid mills, in either continuous or batch operations, as may be preferred under the circumstances.

To effect the turbodrying of the described compositions according to the process of the present invention, suitable commercially available apparatuses known to applicants are the turbodryers sold by Vomm S.p.A. and Bepex Corp. under the names Turbodryer and Solidaire, respectively. Such are available in various sizes, depending on the evaporation capability specified. Thus, apparatuses available can supply heat at rates from 200,000 to 1,000,000 kilocalories per hour. For the 1,000,000 kilocalories/hr. turbodryer the diameter of the apparatus is about 0.9 m., the length is about 7 m. and the turbine blades revolve at about 550 r.p.m., which is at a blade tip speed of about 1,500 meters per minute. It is expected that the dryer will usually contain from 50 to 250 turbine blades, e.g., about 150, and the tip speed thereof will normally be in the range of 1,000 to 2,000 meters per minute, such as 1,300 to 1,700 m./min. Depending on the size of the dryer to some extent, the blades will normally rotate at a speed in the range of 200 to 1,500 r.p.m., preferably 300 to 1,200 r.p.m. and more preferably 400 to 1,000 r.p.m. The blades may be so angled, shaped or oriented as to impart centrifugal and axially forward forces to the material being dried, which material will usually follow a substantially helical path through the dryer. Blade modifications to accomplish applicants' purpose are within the skill of the art. In accordance with normal drying practice feed and withdrawal rates will be controlled so as to maintain an optimum ratio of air to "solids" in the dryer, to promote free movement of materials therein. The turbine blade tips will clear the preferred horizontal inner cylindrical wall of the turbodryer (which defines the turbodrying zone) by no more than one centimeter, and such clearance will preferably be less than 0.5 cm., e.g., 0.2 to 0.4 cm. The inlet air temperature to the dryer will normally be in the range of 100° to 250° C., and the wall temperature of the dryer will normally be in the same range. Preferably such ranges will be 150° to 220° C. It is thought that the residence time in the dryer will normally be in the range of 10 seconds to 10 or 20 minutes, e.g., about one minute.

Suitable turbomixers are sold by Vomm S.p.A. and Bepex Corp. under the marks Turbomixer and Turbolizer, respectively. In such turbomixers the number of turbine blades may be about the same as in the dryer but such can also depend on the sizes of the apparatuses employed and other considerations. The tip speeds are usually higher in the mixers, normally being expected to be in the range of 1,000 to 3,000 meters per minute, with rotational speeds expected to be in the range of 500 or 1,000 to 2,000 r.p.m. Residence times are expected to be about 10 seconds to 10 minutes, e.g., about one minute.

The water insoluble carrier employed in making the particulate detergent compositions by the invented process is preferably a clay and more preferably is a fabric softening bentonite. Such bentonite is swellable and is normally in the form of sodium bentonite but non-swelling bentonites may also find use, such as calcium and magnesium bentonites. In some cases, such non-swelling bentonites may have been previously converted by suitable treatment, as with sodium carbonate, to swellable sodium bentonites, to increase their fabric softening activities, and in other instances the calcium and/or magnesium bentonites may be utilized and may be converted to sodium bentonite by sodium carbonate or other neutralizing agent, which may also be present in the built detergent compositions that are made from the products of the present processes. Such conversion may also be effected during the turbomixing and turbodrying processes, or it may occur in the wash water. Instead of bentonite, other smectites and montmorillonites may be employed, as may be other clays, such as kaolins, although in many such instances such clays do not possess the very desirable fabric softening properties of bentonite, and therefore function principally as carriers for the anionic detergents. Among sources of fabric softening bentonites and other clays there may be mentioned Industria Chimica Carlo Laviosa, American Colloid Company, Industrial Division, and Georgia Kaolin Company, some suitable bentonites of which are sold under the Laviosa AGB, American Colloid and Mineral Colloid designations, respectively. Such bentonites are also described in British patent specification No. 1,400,898 and in U.S. Pat. No. 4,419,250, the disclosures of which are hereby incorporated by reference. Such fabric softening bentonites will desirably contain a moisture content of at least 3%, which helps to maintain the bentonite in desired crystalline form, in which form crystal laminac thereof readily slide past each other. When the bentonite is held to fibrous surfaces, after deposition on laundry material fibers during washing, it makes the dried fibers feel lubricated and soft to the touch. Bentonite and other useful clays are available in different finenesses and for the purposes of the present invention it is desirable to employ a bentonite or clay powder that will pass through a No. 140 sieve (U.S. Sieve Series), with it being preferred that it pass through a No. 200 sieve and more preferably, through a No. 325 sieve.

The anionic detergent component of the invented agglomerates is an anionic synthetic organic detergent, which is usually employed in a soluble salt form, preferably as a sodium salt. Although other types of anionic detergents may be utilized, such as sodium higher fatty acyl sarcosides, the preferred water soluble synthetic organic anionic detergents employed are those which are described as of a sulfonate or sulfate type, which may be designated as sulf(on)ates. Such include linear higher alkylbenzene sulfonates (preferred), higher fatty alcohol sulfates, higher fatty alcohol polyethoxylate sulfates, olefin sulfonates and paraffin sulfonates. An extensive listing of anionic detergents, including such sulfate and sulfonate detergents, is given at pages 25 to 138 of the text *Surface Active Agents and Detergents*, Vol. II, by Schwartz, Perry and Berch, published in 1958 by Interscience Publishers, Inc., and is incorporated herein by reference. Usually the higher alkyl group of such detergents is of 10 to 18 carbon atoms, preferably 12 to 15 carbon atoms, and the ethoxylate contents of such detergents that are ethoxylated will preferably be in the range of 3 to 30 ethoxy groups per mole. When the anionic detergent is the highly preferred higher alkylbenzene sulfonate, the higher alkyl lipo phile will preferably be linear and of 12 to 13 carbon atoms, and the cation thereof will be sodium.

In making the particulate compositions of the present invention all that is necessary is for the powdered bentonite to be suitably mixed with the aqueous medium containing the anionic detergent by mixing of a detergent solution with the insoluble powder in a turbomixer or other suitable mixer, followed by turbodrying, so that the desired strong, globular, high-density beads result. The detergent effectively reduces surface tension and thereby assists in wetting the bentonite or other insoluble powder in the turbomixing and initial turbodrying operations, favoring production of a stronger and denser product.

The anionic detergent may be in the form of a solution, which is preferable, or a dispersion (or a mixture of such two) in the aqueous medium, and preferably the aqueous medium will be that resulting from neutralization of detergent acid. It is known that after sulf(on)ation and neutralization of detergent acid, in an aqueous medium, the reaction mixture will contain the sulfate or sulfonate detergent in neutralized form, usually as a sodium salt, but will also contain sodium sulfate. To aid in the separation of the detergent salt from the sodium sulfate a lower alcohol is often employed to extract the detergent. Thus, the detergent solution, even after separation from the aqueous sodium sulfate phase and removal of alcohol by distillation, may still contain some alcohol in an aqueous solution, solution/dispersion or paste of detergent. Whether or not such alcohol is present, aqueous medium containing the detergent may be directly charged to the turbomixer or turbodryer, with the bentonite. In such manufacturing process, utilizing the detergent "solution" as is, any excess water and/or alcohol which may be present helps to speed mixing, in either the mixer or the turbodryer, but will be removed during turbodrying. Although it is preferred to employ turbomixing and turbodrying and, less preferably, to utilize other forms of mixing before turbodrying, it is also within the invention to utilize the turbodryer to mix the bentonite and LAS components, to form them into particles, and to dry and shape such particles. In such situations the turbodrying operations will be controlled so as to allow sufficient mixings of the components in the initial portion of the turbodrying operation and still allow sufficient residence time in the dryer for the resulting mix to be fragmented, shaped and dried sufficiently. In some such cases the same operating conditions as previously described may be utilized but the drying zone may be lengthened accordingly, and alternatively, longer residence times may be employed, e.g., up to 50% longer.

Although the particulate detergent composition made by the processes of the invention needs to contain only the anionic synthetic organic detergent and clay, in desired bead form, optionally it may also contain water, binder (which also can serve as a strengthener for the particles), and adjuvants. Among the binders which may be utilized are various water soluble inorganic salts, such as sodium silicate (preferably of a $Na_2O:SiO_2$ ratio in the range of 1:1.6 to 1:3.0, more preferably 1:2 to 1:2.8, and most preferably about 1:2 or 1:2.4, usually employed as an aqueous solution), sodium carbonate and sodium sulfate. Also useful are various organic polymers, some of which also may function as builders to improve detergency. Included among such polymers may be mentioned sodium carboxy-lower alkyl celluloses, sodium lower alkyl celluloses and sodium hydroxy-lower alkyl celluloses, such as sodium carboxymethyl cellulose, sodium methyl cellulose and sodium hydroxypropyl cellulose, polyvinyl alcohols (which often also include some polyvinyl acetate), polyacrylamides, polyacrylates and various copolymers, such as those of maleic and acrylic acids. Molecular weights for such polymers vary widely but most are within the range of 2,000 to 100,000. One such polymer, sold under the trademark Sokalan CP5, is the sodium salt of a copolymer of maleic and acrylic acids in which the ratio of such moieties is within the range of 1 to 10 to 10 to 1, and for which the molecular weight is in the range of 60,000 to 70,000. Such copolymer, in a proportion which may be utilized in the present compositions and processes, acts to improve detergency, soil antiredeposition, processing characteristics and bead strengths of the detergent compositions made, and such effects are achieved without adversely affecting detergency and softening actions of the detergent compositions on laundry being washed.

Various adjuvants that may be incorporated in the invented fabric softening detergent compositions, either by separate additions in the manufacturing process or in the aqueous detergent before mixing with the clay, are those that are well known in the art which, despite the presences of only relatively minor proportions, impart desirable characteristics to the final product. They include, but are not limited to chelating agents or sequestrants, e.g., EDTA, NTA, colorants, perfumes, optical brighteners, stabilizers, anti-oxidants, anti-redeposition agents and soil release promoters. However, often most of such adjuvants will be incorporated in the builder composition portion of any built detergent composition to be made or will be post-added, so that the turbodrying process can be better controlled (without such adjuvants affecting it).

The described detergent-bentonite particulate product may be employed as made, or may be utilized as a detersive component of various detergent compositions, including hard surface cleaners, scouring cleansers and bleaching detergent compositions, but it will preferably be used as the detersive (and fabric softening) component of a built laundry detergent composition, in which case it will be mixed with a builder composition, the builder of which improves the detersive action of the anionic detergent component of the agglomerate. Such builder composition will preferably be in spray dried bead form, having been spray dried from an aqueous crutcher mix of the components thereof, but it is within the broader aspects of the present invention to mix components or sub-combinations of components of the builder composition with the turbodried particles, and it is also within the invention to post-add other components of the final composition to the mix.

The principal builders which may be components of the builder composition are water soluble inorganic salt builders, preferably sodium salts, such as sodium polyphosphates, e.g., sodium tripolyphosphate and sodium pyrophosphate, sodium carbonate, sodium bicarbonate, sodium sesquicarbonate, sodium silicate, sodium metasilicate and sodium borate. In addition to the water soluble inorganic salts, water insoluble builders may also be useful, including the ion exchanging zeolites, such as Zeolite 4A. Organic builders may be employed but usually will not be subjected to spray drying if they are heat sensitive, as some of them are, in which case they will normally be post-added (if their presences are considered to be desirable). Among suitable organic builders are polyacetal carboxylates, such as are described in U.S. Pat. No. 4,725,455, and water soluble salts of lower hydroxycarboxylic acids, such as sodium citrate and sodium gluconate. Various polymeric materials, some of which were previously mentioned in this specification as suitable organic binders, also may possess building functions for anionic detergents. It will be noted that water soluble silicates and carbonates, which were previously said to be useful binders in applicants' beads, also may serve as builders. When such compounds are present in the turbodried beads it is considered that their function is binding or bead strengthening and when they are present in spray dried builder composition beads or in builder compositions of other types they will be considered as builder components, although it is recognized that in both such cases they will still perform the other functions.

Although the builder is the only required component of the builder composition portion of the built detergent composition that may be made, utilizing the bentonite/LAS beads made by the invented process, other materials may also be present in such compositions. Sodium sulfate, while often characterized as a filler and as a byproduct of the neutralization of detergent acid, often helps to improve the quality of spray dried beads by strengthening them, diminishing any tendency to cake, and by improving or helping to maintain desired flowability. When it is used as a binder for the turbodried particles they will also usually be improved in such respects due to its presence. Fluorescent brighteners, such as distilbene sulfonates, which are well known in the art, are usually heat stable and therefore are often incorporated in the crutcher compositions. Similarly, chelating agents, such as EDTA (sodium salt of ethylene diamine tetraacetic acid) and NTA (sodium salt of nitrilotriacetic acid), may also be present. Adjuvants of the types previously mentioned for the turbodried beads may also be included in the crutcher mix to be converted to spray dried builder composition beads, providing that they are sufficiently heat stable, but even those which are not heat stable may be post-added or may be included in mixed builder compositions which are not to be subjected to spray drying conditions or otherwise to be heated sufficiently to cause deteriorations. Sometimes it may be desirable to limit foaming of the built detergent composition and in such case a sodium higher fatty acid soap, such as sodium stearate, sodium tallowate or sodium coco-tallowate, may be incorporated in the crutcher mix or may be post-added, usually in relatively minor proportion. Silicones can be added in the crutcher or may be post-added, in granular or agglomerated forms, to help to control foaming.

Another "adjuvant" for the builder composition which may be employed is nonionic detergent, such as a condensation product of a higher fatty alcohol or of an alkylphenol with a lower alkylene oxide, such as ethylene oxide or a mixture of ethylene oxide and propylene oxide. In such nonionic detergent the higher fatty alcohol will normally be of 12 to 15 carbon atoms and the alkyl of the alkylphenol will usually be of 7 to 9 carbon atoms, and there will usually be present from 3 to 20, preferably 6 to 11 moles of ethylene oxide per mole of higher fatty alcohol, or 3 to 20 moles of ethylene oxide per mole of middle alkylphenol. Such nonionic detergent, in liquid state (usually at elevated temperature), may be oversprayed onto spray dried base builder composition beads, when such are employed, and will be absorbed by them, or it may be included in the crutcher mix.

Other adjuvants which could be adversely affected by heat or by wetting may be post-added to the mixture of turbodried beads and builder composition, and even stable adjuvants may be conveniently post-added, when desired. Among such post-adjuvants may be mentioned bleaches, such as sodium perborate, enzymes, such as proteolytic and amylolytic enzymes, antifoam agents, such as silicones, anti-wetting agents, such as siliconates, solubilizing agents and buffers, such as higher fatty alcohol phosphoric esters, flow aids, such as magnesium silicate powder, and perfumes. Sometimes it may also be desirable to color the final composition, as by spraying a dilute solution of dye onto the surfaces thereof. Usually the bleach, perfume and flow aid will be post-added to the composition near the end of the manufacturing process. Of course, although water may not be an essential component of the builder composition (or of the turbodried detergent/bentonite composition or of the final product) it will usually be present too, in relatively minor proportion, normally mostly in "bound" rather than "free" state, and often in hydrated compounds.

The following descriptions of proportions of components in the bentonite/linear higher alkylbenzene sulfonate detergent (LAS) beads apply also to bentonite beads made with other anionic detergents and to clay and insoluble particulate carrier beads made with such detergents. In such products the proportions of LAS or anionic detergent will be in the range of 5 to 50% although, if desired, one could make turbodried beads containing as little as 0.5% of LAS, by adjustment of proportions of other components in the bead formulation, and sometimes also by suitable changes in the processes. Preferably the content of LAS will be 10 or 20 to 45 or 50%, and in particularly preferred formulations it will be about 24% and about 44%. Proportions of bentonite in such formulations will usually be in the range of 50 to 95%, preferably being 55 or 60 to 80 or 90%, and more preferably, in two very desirable formulations, will be about 70% and about 50%, respectively. With the two main components there may be present from 0 to 20% of a combination of binder, adjuvants and water, and when binder is present the proportion thereof will desirably be in the range of 0.5 to 10%, preferably 1 to 5% and in some more preferred formulations, about 2%. The water content of the finished beads will usually be in the range of 1 to 10%, preferably 1 to 5%, and forsome more preferred formulations, about 1 or 2%. Adjuvants content will usually be minimized in the turbodried beads and often will be limited only to a dye, in very small proportion, usually less than 0.1%. Often, as for undyed materials, the adjuvant content may be 0%. However, it is within the invention to utilize larger proportions of adjuvants but such will normally not exceed 10% and desirably will be less than 5 or 7%, inclusive of any sodium sulfate, either added or with the LAS.

In the turbodried beads the proportion of bentonite to LAS (or insoluble carrier to anionic detergent) will normally be in the range of 1:1 to 8:1, preferably being in the range of 1:1 to 4:1 and more preferably in the range of 5:4 to 7:2. Of course, such will also be the proportions of such materials charged to the turbomixer and turbodryer. Additionally, there will be present in such charges the water accompanying the LAS, which will normally be about 20 to 50%, preferably 20 to 40%, and more preferably 22 to 31%, which water derives from the LAS paste charged, which usually contains from 30 to 60%, preferably 40 to 50% of water.

The particle sizes of the turbodried LAS-bentonite beads will usually be such as will pass through a No. 4 sieve and rest on a No. 120 sieve, preferably being in the 6 or 8 to 100 sieves range, and more preferably in the 10 to 80 or 100 sieves range. The bulk densities of the LAS/bentonite products will normally be at least 0.7 g./cc., preferably being at least 0.8 g./cc. and more preferably will be 0.85 or 0.9 g./cc. The practical upper limit on bulk density is about 1.0 g./cc. so a preferred range is 0.8 to 1.0 g./cc. However, although it is a significant aim of the present invention to make high bulk density detergent compositions and high bulk density built laundry detergent compositions, in some instances it may be desirable intentionally to produce similar compositions but of lower bulk density, and such compositions, although not considered to be as advantageous as the higher bulk density products to which this invention is primarily directed, are not intended to be excluded from the scope of the invention.

The built particulate detergent compositions made from the turbodried beads of this invention are primarily of the LAS-bentonite type (such terminology was also used herein as a short reference to carrier-anionic detergent beads, broadly) but built detergent compositions made from other detergents and carriers, with or without other functional components, may be present instead or additionally. Such materials may also be omitted but usually perfume will not be omitted.

The particulate builder composition employed, which is preferably spray dried and which is to be mixed with the LAS-bentonite agglomerate (and with other adjuvants and functional components), will normally include 40 to 100% thereof of builder for the anionic synthetic organic sulf(on)ated detergent and 0 to 60% of a total of binder(s), filler(s), adjuvants and water. Preferably such builder composition will include 40 to 90% of builder, 0 to 40% of filler, 1 to 20% of water and 0 to 35% of adjuvants, and more preferably it will comprise 40 to 70% of sodium tripolyphosphate, 2 to 10% of sodium silicate, with the proportion of polyphosphate to silicate being in the range of 5-20:1, 10 to 35% of sodium sulfate filler, 5 to 20% of water and 1 to 30% of adjuvants. In more preferred builder compositions the content of inorganic builder salt will be 50 to 60%, including both sodium tripolyphosphate and sodium silicate, in 7-15:1 proportion, and the beads will also include 20 to 30% of sodium sulfate, 10 to 20% of water and 2 to 8% of other adjuvants. In a specific preferred formula such builder composition is spray dried and comprises about 50% of sodium tripolyphosphate, about 25% of sodium sulfate, about 5% of sodium silicate and about 5% of nonionic detergent (here considered to be an adjuvant), which may be spray dried with the crutcher mix or may be post-sprayed onto the spray dried builder beads, and the balance of water, which can be about 15 or 16%.

In the process for manufacturing the high bulk density particulate detergent composition beads the composition of bentonite and LAS solution or paste (often the physical state thereof depends on temperature and solids content) is added to a turbodryer like that represented in the drawing, with the ratio of LAS : bentonite being in the range of 1:1 to 1:4 and with 20 to 50% of water being present in the mixture. In such mixture the bentonite is a powder which passes through a No. 325 sieve and the LAS is in a solution, dispersion or paste which preferably contains about 50% of sodium $C_{12-13}$ benzene sulfonate, about 6% of sodium sulfate and about 44% of water (sometimes with a small proportion thereof, e.g., 1 or 2%, of isopropanol). Normally the active ingredient content of the detergent paste will be in the range of 40 to 60%, preferably 45 to 55%. The sodium sulfate content thereof will usually be from 10 to 20% of the active detergent content, with a narrower range for sodium sulfate content being 12 to 15% of the active ingredient. The proportion of water charged to the turbodryer as a component of a detergent paste or solution will be about 20 to 50% of the total charge, and the drying air temperature will be in the range of 100° to 250° C., preferably being in the 150° to 200° C. range, e.g., about 180° C. The internal wall of the drying zone will usually be kept at about the same temperature as the air entering the dryer. Turbine speeds and residence times in the dryer were previously given and operation of the turbodryer was described in conjunction with the drawing description, and subsequently. When the bentonite and LAS paste/solution are mixed in a mixing zone before entering the turbodryer such mixing zone is preferably in a turbomixer, as previously mentioned, which will often be smaller than the turbodryer, normally being 5 to 50% of such turbodryer volume, e.g., about 10%. The composition of the charge to the mixer will be the same as that previously given for the charge to the turbodryer because little change in the composition of the mix takes place in the turbomixer, although the physical nature of the composition is significantly altered (being substantially homogenized therein). Desirably, the product of the turbomixer or other mixer is discharged from such mixer directly to the turbodryer, so that the combination of mixing and drying procedures is continuous. From the turbodryer the dried strong globular beads, largely of particle sizes in the desired ranges (4 to 120 sieves, preferably 10 to 100 sieves) are removed and,if desired, fines and coarse particles may be removed therefrom by screening or other classification procedures, following which the off-specification particles are returned to the mixer (or less desirably, to the turbodryer inlet). Similar screening and recycling may also be practiced for any other recovered products, such as those recovered from the cyclone, centrifugal separator and/or dust collectors, or such may be sent directly to the turbomixer, without screening.

The products of the invented process, although of essentially the same compositions as products made using other processes for manufacturing detergent compositions in particulate form, are considered to be superior to products of such other processes in various ways. First, no other commercially practicable processes are known, in which globular beads of good strength and of bulk densities as high as those of the present particles can be as readily and reproducibly manufactured. The beads made are free flowing, strong and attractive, and are often more uniform in individual bead compositions and more attractive in appearance than beads made by spray drying and agglomeration techniques. The beads made are of satisfactory flowability, tackiness, frangibility and dispersibility characteristics, and they blend well with spray dried base builder beads, which will be of about the same higher bulk density, to make built particulate anionic detergent compositions.

The apparatuses of this invention, which are especially suitable for making LAS/bentonite beads, include a coupling of a turbomixer and a turbodryer, with conventional means for feeding starting materials to the mixer and for removing product from the mixer and charging it to the turbodryer, from which it is discharged to take-off means at the downstream section of the turbodryer (with some particles being swept out with the heating air). In a further improvement means for separating particulate turbodryer product into specification, undersized and oversized particles are connected to discharge means from the turbodryer and to the turbomixer (or inlet portion of the turbodryer) to which any off-specification particles are recycled.

On-specification beads are subsequently mixed in a conventional mixer, not illustrated, with spray dried base builder beads or with other builder composition particles to make final built detergent compositions of the type previously described. Alternatively, the turbodryer product may be stored in bins and may later be incorporated in or employed as various other types of detergent compositions, including scouring cleansers, wall cleaners, shampoos, unbuilt detergents and detergent laundry bars.

The following examples illustrate but do not limit this invention. Unless otherwise indicated, all parts and percentages in these examples and in the specification and claims are by weight and all temperatures therein are in °C.

EXAMPLE 1

Utilizing apparatus like that illustrated in the drawing and previously described in the specification, which is rated to produce 200 kg./hr., 39.1 parts of an aqueous 50% sodium linear dodecylbenzene sulfonate detergent paste, also containing 6% thereof of sodium sulfate, with the balance being water, and 60.1 parts of bentonite (Detercol P2) were added to the upstream end of the turbomixer until the mixer was fully charged, and were thoroughly mixed in such mixer, with the turbine shaft turning at about 1,000 r.p.m., and with the residence time of the composition in the turbomixing zone being about one to two minutes. The product from the turbomixer, containing 77.5% of solids, was continuously discharged from it to a turbodryer like that previously described and illustrated, using a screw conveyor to assist in such transfer. The turbodryer inlet air temperature was 180° C., the dryer interior wall was maintained at 190° C., using steam in the jacket about such wall, and the total residence time in the dryer was between 30 and 40 seconds. In disaggregation or dividing sections, of the turbodryer, breakings apart of the films or layers of the mix are promoted by the drying thereof that is taking place, and such drying also tends to limit any tendency for the divided particles or sections to recombine. Also, heating of the turbodrying wall helps to increase heat exchanges and helps to avoid objectionable buildup of product film. Such characteristics and actions in the turbodryer may depend to a significant extent on the nature of the LAS/bentonite material being processed.

The substantially globular beads produced in the described pilot plant apparatus were of particle sizes substantially all of which were in the 8 to 120 sieves range and such were screened to desired 10 to 100 sieve size range. The fines and coarse particles are then recycled back to the turbomixer, with additional bentonite and LAS paste. If desired, the finished beads may be dyed by spraying a relatively small proportion of aqueous solution of dye onto moving surfaces thereof, often in a rotating inclined or horizontal drum or in an auxiliary turbomixer. The uncolored beads made are of satisfactory globular appearance and sizes and surprisingly, are of bulk density in the range of 0.8 to 0.9 g./cc., with moisture contents in the range of 1.5 to 3.5%. When tested, such products are of satisfactory flowability, frangibility, dispersibility and anti-caking properties. Additionally, when tested for detergency and fabric softening capability, the products are found to be satisfactorily effective. The turbodryer employed in the described processes is a pilot plant turbodryer which rotates at about 875 revolutions per minute (within the range of 850 to 900 r.p.m.).

EXAMPLE 2

The procedure of Example 1 is repeated but with different proportions of bentonite and LAS paste being employed so as to make a product of higher detergent content. In this example the charge to the turbomixer is of 61.5 parts of 50% active ingredient LAS solution/paste and 38.5 parts of the bentonite, to produce a paste from the turbomixer containing 69.6% of solids. The beads produced were of a moisture content of 1.5%, and were substantially all within the 4 to 120 sieve range, with essentially none smaller than No. 100 but some larger than No. 10 sieve. The bulk density of the particles in the desired 10 to 100 sieve range, is in the 0.8 to 0.9 g./cc. range.

This example shows that the described apparatus, especially as used in the combined turbomixing and turbodrying process, is adaptable to producing LAS/bentonite beads over a comparatively wide range of relatively high LAS contents, without requiring modifications of the equipment or of the operating conditions, which can be highly advantageous. In other words, the apparatuses and processes are not critical ones but can be employed by manufacturing plant operating personnel of average skill level. Of course, if desired, the operations can be automated but because one person can run the entire operation there may be little economic advantage in such automation. One significant economic advantage is in using recycle (oversize and undersize particles returned to the mixer).

As with the product of Example 1 the product of the present example is tested for detergency, fabric softening capability and the various other previously mentioned properties (see Example 1), as produced and as combined with builder composition (which will be described in Example 4). It is found to be satisfactory with respect to all such properties.

EXAMPLE 3

In a scale-up experiment, utilizing a larger turbomixer and a larger turbodryer, with a capacity of about 3,600 kilograms per hour and a dryer thermal capacity of about 1,000,000 kilocalories per hour, bentonite/LAS beads containing 20% of LAS (sodium dodecylbenzene sulfonate) 2.4% of sodium sulfate, 2.5% of water and the balance of bentonite, are produced, with essentially the same operating conditions and the same starting materials as in Example 1. Charcteristics of the dried detergent composition beads resulting are the same as those described in Examples 1 and 2 except that the bulk density of the dried beads, over the course of the run, averages about 0.8 g./cc. (varying from about 0.7 to 0.9 g./cc.). In the scale-up larger apparatuses are used and the speeds thereof are lowered, to 750 r.p.m. for the turbomixer and to 550 r.p.m. for the turbodryer.

EXAMPLE 4

High bulk density spray dried builder base composition beads are made by conventionally spray drying a crutcher mix to 15% moisture content beads, of a bulk density of about 0.7 g./cc. and particle sizes in the 10 to 100 sieves range. The crutcher mix contains 30.0% of sodium tripolyphosphate, 12.4% of sodium sulfate, 3.0% of sodium silicate ($Na_2O:SiO_2=1:2$), 1.0% of sodium hydroxide (free caustic contained in the system, as a result of previous neutralization of detergent acid), 0.5% of Sokalan CP5 (acrylic-maleic copolymer), 0.3 of sodium carboxymethyl cellulose and 0.3% of fluorescent brightener. The crutcher mix utilized contains 55% of solids and 45% of water, and is readily pumpable. The various percentages of consitituents mentioned above are percentages thereof in a final built detergent composition, to be described herein.

Onto the spray dried builder composition base beads there are sprayed three parts (and all parts subsequently given herein correspond to percentages in the final built detergent composition) of liquid state synthetic organic nonionic detergent which is the condensation product of one mole of $C_{12-15}$ fatty alcohol with 11 moles of ethylene oxide, at a temperature of about 55° C., which nonionic detergent is absorbed by the builder beads, after which there are admixed with such beads three parts of soap (sodium soap of 80:20 tallow:coco fatty acids), 21 parts of the turbodried high bulk density fabric softening detergent composition particles of Example 3, 0.3 part of hydroxyamine sulfate, 0.3 part of enzyme (Alcalase), 15 parts of sodium perborate tetrahydrate, 0.3 part of potassium methyl siliconate (with 0.3 part of water, because the potassium methyl siliconate is applied as a 50% aqueous solution), and 0.5 part of perfume. Mixing of the spray dried beads and the post-added materials takes place in a horizontal drum mixer but any suitable other mixers may be employed too, such as a V-mixer, or a Day ®mixer.

The product made is of a bulk density of about 0.7 g./cc. and tests satisfactorily as a fabric softening detergent. In a modification of the process the nonionic detergent is included in the crutcher mix and is spray dried with the rest of the builder composition, instead of being applied to such beads and absorbed by them. By controlling tower conditions and particle size distribution of the spray dried builder composition beads the bulk density thereof may be increased to 0.8 g./cc., in which case the final particulate product will be of such bulk density, too.

When the turbodried detergent composition of Example 1 is employed as a component of the described built detergent composition the end product contains about 5% of anionic detergent, and such product may be used as a comparatively low foaming detergent. When the turbodried beads of Example 2 are employed instead, about 9% of anionic detergent is contained in the final product, and such product may be moderately foaming. To lower foaming of such compositions soap may be included in the final product formula, as in this example, and to increase foam more LAS may be used (and no soap)

EXAMPLE 5

The proportions of components and the operating conditions of the previous examples may be varied ±10%, ±20% and ±30%, while still remaining within the ranges previously recited in this specification, and useful products of the types described will be obtained. In other variations of the processing conditions, the turbodryer may be employed for both mixing and drying operations. Although it is considered that products made by turbomixing followed by turbodrying are superior, those made by employing turbodrying only are still usable and are of desired high bulk density, particle size distributions and properties. Furthermore, while turbodryings of LAS/bentonite or anionic/inorganic water insoluble carrier compositions proceed especially well in the described processes and apparatuses, it is also possible to use such processes and apparatuses for turbomixing and turbodrying total final product formulas. In such cases the employment of spray towers can be avoided entirely. By one such process there may be made a composition containing 3% LAS, 3.2% of the nonionic detergent, and 3.6% of the soap, as active detersive components, together with conventional builders and adjuvants, as in Example 4. Similarly, 20% of LAS may be employed and the nonionic detergent and soap may be omitted, with the balance of the composition being conventional builder and adjuvants (with a normal proportion of moisture).

As is seen from the working examples and as was described in the previous portion of this specification, the present invention is highly advantageous because it allows the production by a non-tower method of high bulk density globular particles of a fabric softening detergent composition, and high bulk density built detergent compositions can also be made. Such non-tower method is of surprising thermal efficiency and helps to conserve fuel. Unlike dry mixed products and some agglomerates, the particulate products of this invention, especially those which have been turbomixed, are more uniform in composition, with each particle being of essentially the same composition as every other particle. The invented process lends itself to use for manufacturing all or a portion of a final detergent composition or built detergent composition. The described apparatus is less costly than equivalent spray drying tower capacity would be, occupies less space than an equivalent spray tower, is more flexible in operating, and is more readily prevented from being a source of atmospheric pollution. In summary, the present invention is unexpectedly beneficial for use in the manufacture of detergent compositions, especially those which are particulate and of high bulk density, and it is conceivable that in the future a substantial proportion of such detergent composition production may be by the described apparatuses and by the invented processes.

The invention has been described with respect to working examples and illustrative embodiments thereof but is not to be limited to these because one of skill in the art, with access to the present specification, will be able to utilize various substitutes and equivalents without departing from the invention.

What is claimed is:

1. An apparatus for manufacturing high bulk density particulate synthetic anionic organic detergent composition from bentonite and aqueous synthetic anionic detergent in liquid or paste form which comprises a turbomixer, which is a longitudinally extending mixer containing 50 to 250 turbine blades that revolve about a longitudinal axis inside a cylindrical housing, with tips of such blades terminating near the housing and rotating at tip speed in the range of 1,000 to 3,000 meters per minute, so that a mix of bentonite and aqueous synthetic anionic organic detergent in the turbomixer is subjected to centrifugal and axially forward forces, means for feeding bentonite to the turbomixer, means for feeding synthetic anionic organic detergent in aqueous liquid or paste form to such turbomixer, means for removing product from such turbomixer, a turbodryer, which is a longitudinally extending dryer comprising a cylindrical housing, means for heating the turbodryer, and 50 to 250 turbine blades that revolve about a longitudinal axis inside the cylindrical housing, with tips of such blades terminating near the housing and rotating at tip speed in the range of 1,000 to 2,000 metes per minute, so that a slurry or paste of bentonite and aqueous synthetic anionic organic detergent, when fed to the turbodryer, is subjected to centrifugal and axially forward forces, so that dried product is moved through the turbodryer, means for feeding a product, which is a slurry or paste of bentonite-synthetic anionic organic detergent-water composition, directly to the turbodryer from the turbomixer, and means for discharging dried high bulk density particulate synthetic organic detergent composition from the turbodryer.

2. An apparatus according to claim 1 which comprises means for separating particulate product of the turbodryer, which is of specified particle size range, from undersized and oversized particles, and means for returning the off-specification particles to the turbomixer for further processing.

* * * * *